S. E. EKLUND.
SCALE.
APPLICATION FILED APR. 15, 1912.
1,270,801.
Patented July 2, 1918.
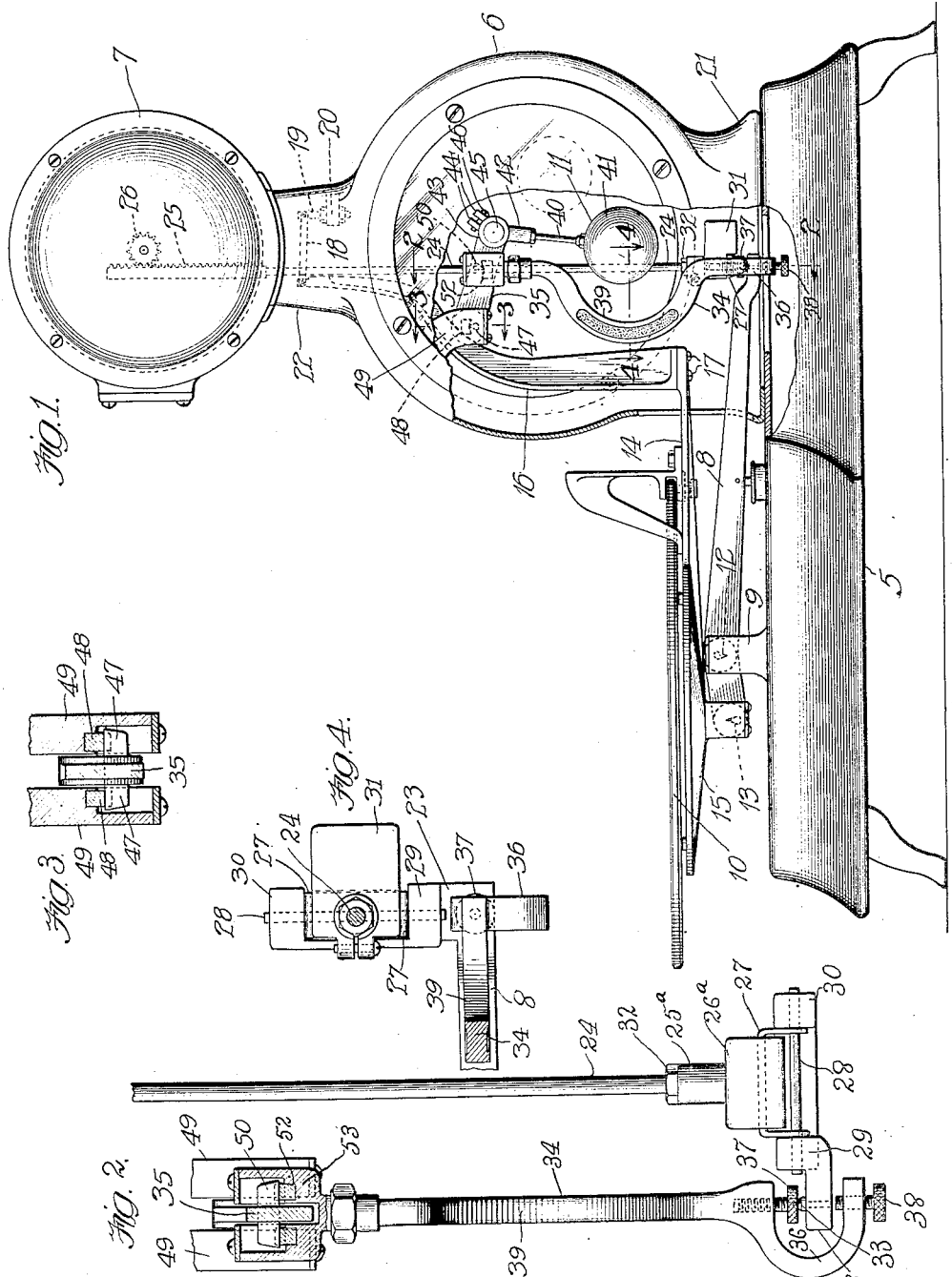
Witnesses
Martin H. Olsen
Robert Dobberman
Inventor
Stone E. Eklund
By Rector, Hibben, Davis & Macauley
Attys.

UNITED STATES PATENT OFFICE.

STONE E. EKLUND, OF TOLEDO, OHIO, ASSIGNOR TO THE TOLEDO SCALE COMPANY, OF TOLEDO, OHIO, A CORPORATION OF NEW JERSEY.

SCALE.

1,270,801.      Specification of Letters Patent.      Patented July 2, 1918.

Application filed April 15, 1912. Serial No. 690,792.

*To all whom it may concern:*

Be it known that I, STONE E. EKLUND, a citizen of the United States, residing at Toledo, Lucas county, Ohio, have invented certain new and useful Improvements in Scales, of which the following is a specification.

My invention relates more particularly to pendulum scales, that is to say, to scales which comprise a beam upon which is mounted the scale pan or platter to receive the goods or article to be weighed, and which is so connected to a pendulum that the movement of the beam under any weight imposed upon the scale pan or platform displaces the pendulum until equilibrium in the system is restored. My invention consists in its broader aspect in a scale of this character in which the beam is a lever of the first order, or, in other words, fulcrumed between the scale pan and the connection to the pendulum counter-balance, and the last named element is pendant or in its lower position when there is no weight upon the scale pan and the scale is in equilibrium. Another important feature of my invention relates to the adjustment of the pendulum, and still other features will appear from the following specification taken in connection with the drawing and are pointed out in the following claims. In the accompanying drawings, I have shown a specific form of scale embodying my invention and in the following specification I have described it in detail; but it is to be understood that the specific disclosure is for the purpose of exemplification only, and my invention is not limited thereto, but is defined in the following claims.

Referring now to the drawing: Figure 1 is a side elevation of a scale embodying my invention, the casing thereof being partly broken away to show the interior mechanism; Fig. 2 is a detail elevation upon an enlarged scale partly in section upon the line 2—2, Fig. 1; Fig. 3 is a vertical section on the line 3—3 of Fig. 1; and Fig. 4 is a horizontal section upon the line 4—4 of Fig. 1. Each part is identified by the same symbol of reference wherever it occurs in the figures.

In the particular embodiment shown, the base 5, casing 6 and indicating cylinder 7 are or may be substantially as in scales of this character in the prior art, though it is to be understood that my invention is not limited to use in connection with scales having cylinder indicators. The beam 8 of the scale is fulcrumed upon vertical supports 9, which may be cast integral with the base, as shown, and carries at the end of its shorter arm a scale pan or platform 10, and at the end of its longer arm is connected to the counter-balancing pendulum 11 and the indicating cylinder 7. As usual in scales of this character, the pivots of the beam fulcrum 12 and the scale pan fulcrum 13 are knife edges, as shown in dotted lines and in the present instance the horizontal position of the scale pan is achieved by means of a high check comprising a forwardly extending arm 14 upon the scale pan support 15, an upright 16 secured at the outer end of the arm by means of screws 17 and a check link 18 pivoted at one end to the upright and at its other end to an adjustable post 19 secured to a lug 20 formed on the interior of the housing. The form of the housing 6 is immaterial, but, in the present instance, it is watch shaped in general outline, but provided with a flared base 21 and a neck 22, which supports the cylinder casing 7. An opening is provided in the edge of the casing through which enter both the end of the scale beam and the arm which supports the upright of the check mechanism, the latter being directly above the former. The end of the long arm of the scale beam within the casing is formed with a perpendicular offset 23 to which is attached a rack rod 24 which carries the rack 25, meshing with a pinion 26 upon the cylinder indicator. At its lower end the rack rod 24 is tapped into a boss 25$^a$ upon a casting 26$^a$ which is pivoted by means of a yoke 27 upon a pin 28 in the lugs 29 and 30 of the offset end of the beam or lever. The casting is also formed with an enlargement 31 which projects upon that side of the rack rod upon which the rack teeth are formed, and by its weight serves to hold the rack in operative engagement with its pinion. Lock nut 32 insures the screw connection of the rod and casting. At the junction between the main body of the beam 8 and its offset portion and in the median line or axis of the beam is mounted a cone 33 which projects upward and serves as a bearing for the thrust rod 34. The latter engages at its upper end the pendulum arm or stem and at its lower end is formed with a lateral bend 36, forming a recess into which extends the adjustable thumb screw 37, which is formed with a concave bearing for the cone 33 upon the scale beam. This thumb screw 37 is tapped into the shoulder at the inner end of the lateral bend and the outer end of said bend is tapped to receive an adjustable thumb screw 38, which is so adjusted as to prevent the cone 33 leaving its seat in the thumb screw 37, but yet to permit ample motion of the parts. Intermediate its ends the thrust rod 34 is laterally curved or offset, as shown at 39, so that it may not interfere with the action of the pendulum. The latter consists of the arm 35, before mentioned, and pendulum rod 40 and the pendulum weight 41, the rod being tapped at its upper end into a boss 42 of a casting which comprises also a split sleeve 43 having lugs 44. The arm 35 is formed at its outer end with a lateral boss 45, which is received within the split sleeve 43, whereby the arm and pendulum rod are angularly adjustable with relation to each other, and, when the desired adjustment is secured, it may be maintained by a screw 46 tapped into the lugs of the split sleeve. At its inner end the pendulum arm 35 is provided with a knife 47, the edge of which is upwardly directed and engages agates 48 carried in a bracket 49 projecting from the casing, as shown in Fig. 1. Intermediate its ends, the pendulum arm is provided with a knife 50 having a downwardly directed edge which engages agates 52 carried in a housing 53 upon the upper end of the thrust rod. The operation of the scale will now be apparent. The weight of the pendulum and its arm are borne upon the upper end of the thrust rod, and the knife which engages the stationary agates is held in contact therewith by a pressure just sufficient to prevent displacement when the scale is empty and in equilibrium. This adjustment may be readily made by adjusting the angular relation of the pendulum rod to the pendulum arm, it being understood that the weight of the scale pan and its attached parts is sufficient under the conditions of leverage to slightly overbalance the weight of the parts at the outer end of the long arm of the scale beam. The addition of weight to the scale pan causes the long arm to rise and lift the pendulum to a position where the latter counterbalances the weight upon the scale pan and restores equilibrium. The indicator chart is in the meantime shifted correspondingly to show the weight of the article being weighed.

In this construction the lever is readily brought into equilibrium with no weight in the pan, for the weight of the scale pan, its support and the check mechanism are so related to those of a pendulum, thrust bar and other parts upon the long end of the beam that the same are equally counterbalanced by reason of the difference in leverage of the two arms of the lever. The scale furthermore may be very readily sealed by adjusting the members of the pendulum with relation to each other about their pivot joint.

I claim:

1. In a weighing scale, a lever of the first order having a long and a short arm, a goods receiver mounted on the short arm, a pendulum, and a thrust rod having a cone and socket connection with the long arm of the lever and connected to and adapted to raise the pendulum when a load is placed on the goods receiver.

2. In a weighing scale, a lever of the first order having a long and a short arm, a goods receiver, mounted on the short arm, a pendulum having a bearing substantially above the long arm of the lever, and a thrust rod interposed between the pendulum and the lever having a knife bearing with one of said elements and a cone and socket bearing with the other of said elements.

3. In a weighing scale, a lever having a short and a long arm, a goods receiver upon the short arm, said short arm overbalancing the long arm of the lever, a pendulum, a bearing therefor upon the frame of the scale, a thrust rod bearing at one end upon the long arm of the lever and exerting an upward thrust upon the pendulum at its other end.

4. In a weighing scale, a frame, a lever mounted thereon having a long and a short arm, a goods receiver on the short arm, an angular pendulum, a knife bearing between the pendulum and the frame and a thrust rod between the pendulum and the long arm of the lever.

5. In a weighing scale, a lever of the first order, having a long and a short arm, a goods receiver mounted on the short arm thereof, a pendulum having a bearing intermediate its ends, a thrust rod connected to the long arm of the beam and engaging the bearing on the pendulum to raise the latter.

6. In a weighing scale, a beam constituting a lever of the first order having a long and a short arm, a goods receiver connected to the short arm of the lever, a lateral extension formed integral with the end of the long arm of the lever, an indicator, connections from said lateral extension to the indicator, a pendulum pivoted above the lever, and a thrust rod connected to the lever and to the pendulum at a point intermediate the ends of the latter.

7. In a weighing scale, a lever of the first order having a long and a short arm, a goods receiver mounted on the short arm of the lever, a pendulum articulated intermediate its ends, and a thrust rod interposed between the lever and the pendulum and adapted to raise the latter when a load is imposed upon the receiver.

8. In a weighing scale, a lever of the first order having a long and a short arm, a goods receiver mounted on the short arm thereof, a pendulum, a thrust rod with relation to which the pendulum is pivoted and on which it is supported, and a bearing on a stationary part against which the end of the pendulum is pivoted.

9. In a weighing scale, a lever of the first order having a long and a short arm, a receptacle mounted upon the short arm, a thrust rod resting upon the long arm of the lever, a pendulum pivoted intermediate its ends upon the thrust rod, a stationary bearing and a pivot upon the pendulum coöperating therewith.

10. A weighing scale comprising a lever of the first order having a long and a short arm, a thrust rod connected to the long arm, a pendulum pivotally mounted upon the thrust rod, a downwardly faced bearing upon a stationary part of the scale, a pivot upon the pendulum engaging and bearing upwardly against said bearing and a goods receiver mounted upon the short arm of the lever and adjusted to slightly overbalance the weight upon the long arm of the lever.

11. In a weighing scale, a lever, a goods receptacle thereon, a pendulum comprising a laterally extending arm and a substantially vertical rod, the rod and arm being angularly adjustable with relation to each other and the arm pivoted independently of the lever to a stationary part of the scale and connections between the lever and arm.

12. In a weighing scale, a lever of the first order having a long and a short arm, a goods receiver mounted on the short arm of the lever, a pendulum pivoted independently of the lever and comprising a laterally extending arm and a rod there being an adjustable pivotal connection between the arm and rod, and a thrust rod between the long arm of the lever and said pendulum arm.

13. In a weighing scale, a lever 8 of the first order a scale pan 10, a pendulum comprising an arm 35 pivoted at 47 to a stationary part of the frame, a rod 40 angularly adjustable with relation to the arm and a weight 41, the arm having a pivot knife intermediate its ends, and a thrust rod engaging the lever and the knife upon the pendulum and arm.

14. In a weighing scale, a lever, a goods receptacle thereon, a pendulum, a thrust rod interposed between the lever and pendulum and comprising a curved body portion 39, a housing at the upper end of the thrust rod having bearings which engage the pendulum and an offset bend at the lower end receiving in its recess an end of the lever, and operating between the lever and thrust bar.

STONE E. EKLUND.

Witnesses:
OSCAR E. BARRINGER,
J. D. BURKHOLDER.